United States Patent Office 3,525,417
Patented Aug. 25, 1970

3,525,417
COMPOSITE SOUND INSULATING BOARDS
André Giraudeau, Montmorency, France, assignor to Les Isolants Francais (Societe Anonyme), Souge-le-Ganelon, Sarthe, France
Filed Nov. 27, 1967, Ser. No. 685,839
Claims priority, application France, Nov. 28, 1966, 3,318
Int. Cl. B32b *3/30;* G10k *11/00*
U.S. Cl. 181—33    4 Claims

ABSTRACT OF THE DISCLOSURE

A composite board of an elastomer material for sound an insulation purposes. The board has two generally laminar components each of which has internal troughs and ridges, which may be opposite one another or may interdigitate. In some embodiments the recess formed by the opposed troughs is occupied by a further elastomer material component.

---

The present invention relates to boards comprising an elastomer material which are intended to provide sound and vibration insulation.

Such boards have been proposed which are formed of a series of components assembled side by side and which have longitudinally extending recesses in their contacting faces.

In these previously proposed boards, the width of the components is small while their thickness is equal to that of the board, subject to the possible presence of protective sheets covering the components.

According to the present invention there is provided a composite sound and vibration insulating board comprising at least two superposed components, the size of the components being substantially equal to that of the whole composite board, and each component having longitudinally extending recess or troughs in their internal surfaces.

The board may be formed of two components, the recesses in one being arranged opposite the recesses in the other; but a relative displacement of the two components might occur, the ridges of the one component then being accommodated at least partially in the recesses of the other component. To avoid this drawback, the two components can be glued to one another.

In a preferred embodiment which renders glueing unnecessary, the board is formed of two components and the recesses or troughs in each component are separated from one another by projecting parts or ridges of smaller section than that of the recesses, the projecting parts or ridges of one said component being accommodated in the recesses or troughs of the other component.

In another embodiment which also renders glueing unnecessary, the board has two components which extend substantially throughout the width of the board and the recesses of which are arranged opposite one another, and a series of auxiliary components of shallow depth, which are arranged in these recesses and the height of which is substantially equal to that of the said recesses. These auxiliary components may be independent of one another or alternatively joined together by portions of shallow depth.

Certain embodiments of boards in accordance with the invention will now be described, by way of example, with reference to the accompanying drawings, in which.

Figure 1:
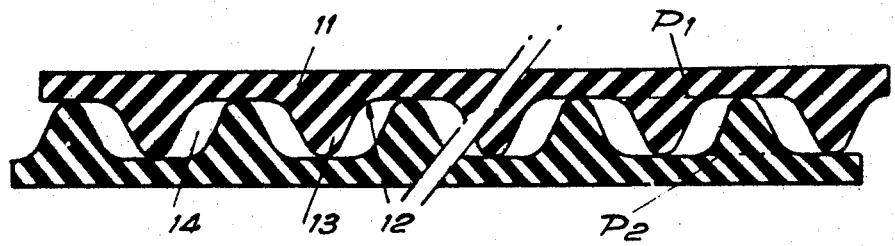
FIG. 1 is a cross section of a first embodiment.

Referring now to the drawings, and in particular to FIG. 1, a composite board is formed of two identical components 11, each having one flat surface and one surface which has recesses or troughs 12 separated by projecting parts or ridges 13; the width and length of these components 11 are substantially identical with those of the composite board. The area of the surface of each hollow trough 12 which is enclosed between the two planes $P_1$ and $P_2$ (broken lines in FIG. 1) which are parallel to the plane surface of the component and bound the hollow is larger than the area of the projecting parts or ridges 13 lying between these planes.

The plane surface of each of the components 11 is directed outwardly and the projecting parts or ridges 13 of each component are arranged in the recesses or trough 12 of the other component. In view of the relative dimensions of the projecting parts or ridges and the recesses or troughs there are thus formed within the board longitudinal passages 14 which enable the material of the board to be forced back when the latter is compressed.

Figure 2:
FIG. 2 is a fragmentary cross section of a modification of the embodiment of FIG. 1.

In the modification of FIG. 2, each of the components has, at each of its longitudinal edges, a portion 15 the inner surface of which is flat and has a depth equal to one half of that of the whole board. When the two components are superimposed, the portions 15 are applied one to the other and can if necessary be glued to one another, which ensures tight sealing within the board.

Figure 3:
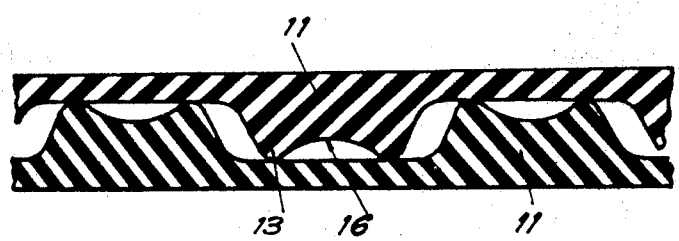
FIGS. 3 to 6 are fragmentary cross sections of other embodiments.

In the embodiment of FIG. 3 an additional recess or shallow trough 16 is provided at the tip of each of the projecting parts or ridges 13.

Figure 4:
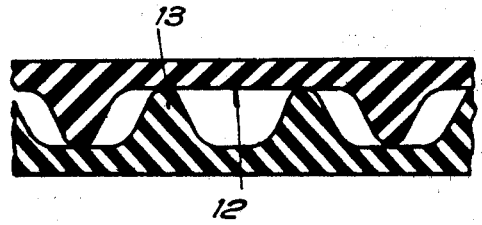

In the embodiment of FIG. 4, the recesses or troughs 12 of each of the components 11 have a large relative width so as to accommodate several projecting parts or ridges 13 of the other component.

Figure 5:
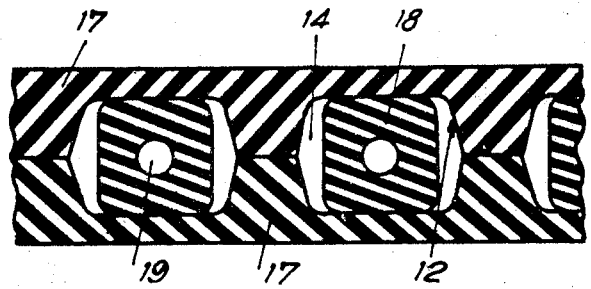
Figure 6:
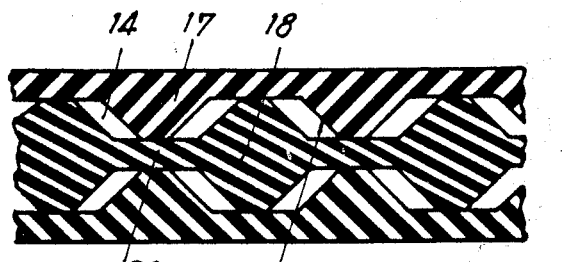

The boards shown in FIGS. 5 and 6 are formed of components 17 similar to the components 11, but the recesses or troughs 12 are arranged opposite one another. Auxiliary components 18 are arranged in the passages 14 thus formed and their height is substantially the same as that of the passages. The components 18 may have longitudinal apertures 19. The auxiliary components may be independent of one another, as in FIG. 5, or they may be joined together by shallow portions 20, as in the embodiment of FIG. 6.

Figure 7:
FIGS. 7 to 9 are fragmentary cross sections of modifications of certain component parts of the complete boards.
Figure 8:
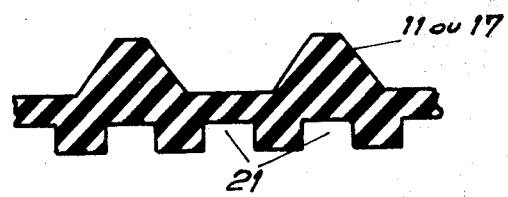
Figure 9:
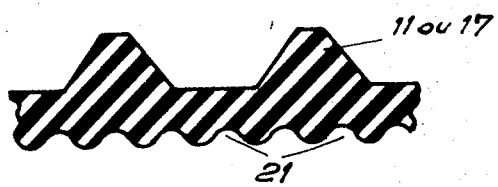

The outer surface of the components 11 and 17, instead of being plane, may have recesses or troughs 21; the latter may, for example, be of triangular section (FIG. 7), rectangular section (FIG. 8), or substantially sinusoidal section (FIG. 9).

Figure 10:
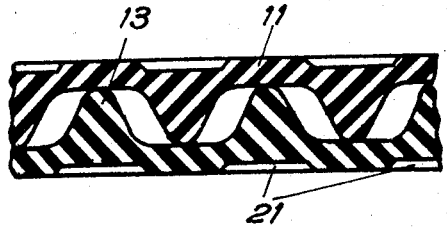
FIG. 10 is a fragmentary cross section of a further embodiment of a board in accordance with the invention.

The recesses or troughs 21 may be arranged, as shown in FIG. 10, at right angles with respect to the projecting parts or ridges 13.

What is claimed is:

1. In a sound and vibration insulating board made from a plurality of components comprising means in each of said components defining a plurality of recesses,
    said recesses of the respective components facing opposite one another,
    the overall size of each component being substantially equal to the overall size of the insulating board,
    a series of auxiliary components disposed in said recesses, said auxiliary components being of a thickness substantially equal to the combined depth of two opposite facing recesses, said auxiliary components being joined to one another by relatively thinner connection portions.

2. In a sound and vibration insulating board made from a plurality of components, comprising means made of elastomeric material in each of said components defining a plurality of longitudinal recesses, said recesses of the respective components facing opposite one another, a series of auxiliary components disposed in said oppositely facing recesses, said auxiliary components being of a thickness substantially equal to the combined thickness of two oppositely facing recesses, each of said oppositely facing recesses having a combined transverse cross sectional area greater than the transverse cross sectional area of said auxiliary component disposed in the respective oppositely facing recesses, thereby defining a space between said recesses and said auxiliary component to facilitate deformation of the elastomeric material.

3. In a sound and vibration insulating board as set forth in claim 2 wherein said auxiliary components are independent of one another.

4. In a sound and vibration insulating board as set forth in claim 2 wherein said auxiliary components are secured to one another.

References Cited

UNITED STATES PATENTS

| 1,172,710 | 2/1916 | Howe. | |
| 1,870,323 | 8/1932 | Cattaneo | 161—120 |
| 2,020,639 | 11/1935 | Grayson et al. | 161—119 |
| 2,192,516 | 3/1940 | Cunnington. | |
| 2,386,502 | 10/1945 | Peik. | |
| 3,087,570 | 4/1963 | Watters et al. | |
| 3,176,789 | 4/1965 | Lighter. | |
| 3,216,167 | 11/1965 | Roberts et al. | |
| 3,262,521 | 7/1966 | Warnaka. | |

FOREIGN PATENTS

| 85,645 | 6/1958 | Denmark. |
| 1,117,463 | 2/1956 | France. |
| 70,221 | 6/1952 | Netherlands. |

ROBERT S. WARD, JR., Primary Examiner

U.S. Cl. X.R.

161—120